(12) United States Patent
Tanaka et al.

(10) Patent No.: US 7,725,364 B2
(45) Date of Patent: May 25, 2010

(54) PART CATALOG CREATING SYSTEM

(75) Inventors: Shigetsugu Tanaka, Hyogo (JP); Masami Ueda, Hyogo (JP); Koichiro Nishi, Hyogo (JP); Kenzo Okamoto, Hyogo (JP); Takao Yasui, Hyogo (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 540 days.

(21) Appl. No.: 10/486,048

(22) PCT Filed: Oct. 25, 2002

(86) PCT No.: PCT/JP02/11081

§ 371 (c)(1),
(2), (4) Date: Feb. 6, 2004

(87) PCT Pub. No.: WO03/038688

PCT Pub. Date: May 8, 2003

(65) Prior Publication Data

US 2004/0199434 A1    Oct. 7, 2004

(30) Foreign Application Priority Data

Oct. 29, 2001  (JP) .............................. 2001-331126

(51) Int. Cl.
G06F 17/30    (2006.01)
(52) U.S. Cl. .......................................... 705/27; 705/26
(58) Field of Classification Search ................. 705/26, 705/27, 1
See application file for complete search history.

(56) References Cited

U.S. PATENT DOCUMENTS 5,777,877 A    7/1998  Beppu et al.
6,104,962 A *  8/2000  Sastry .......................... 700/86
6,151,588 A * 11/2000  Tozzoli et al. ................. 705/37
6,167,383 A * 12/2000  Henson ......................... 705/26

(Continued)

FOREIGN PATENT DOCUMENTS

EP    0 520 923 A2    12/1992

(Continued)

OTHER PUBLICATIONS

"Part.com Begins Charging for TradeMotion Storefront" PR Newswire. New york: Mar. 20, 2001. p. 1. Retrieved via ProQuest.*

(Continued)

*Primary Examiner*—Jeffrey A. Smith
*Assistant Examiner*—Michael A. Misiaszek
(74) *Attorney, Agent, or Firm*—Marshall, Gerstein & Borun LLP

(57) ABSTRACT

In a part catalog creating system, a part table containing design change numbers respectively set for parts, and header numbers, part numbers, and quantity of the parts, each of which corresponds to the design change numbers, is created, and product number data that contains design change number of part used for manufacturing each product is created, and information that coincides with the product number data is selected from the part table, thereby creating a product number list. The product number list and images of parts corresponding to the product number list are combined and the part catalog data for each product number is output. Thus, the part catalog can be easily created without errors.

4 Claims, 10 Drawing Sheets

U.S. PATENT DOCUMENTS

| | | | |
|---|---|---|---|
| 6,725,257 B1 * | 4/2004 | Cansler et al. | 709/219 |
| 2002/0073001 A1 * | 6/2002 | Palmer et al. | 705/29 |
| 2002/0143653 A1 * | 10/2002 | DiLena et al. | 705/26 |
| 2005/0044383 A1 * | 2/2005 | Maeda et al. | 713/182 |

FOREIGN PATENT DOCUMENTS

| | | |
|---|---|---|
| JP | 09-162036 | 6/1997 |
| JP | 2001-282343 | 10/2001 |
| WO | WO-97/27554 | 7/1997 |
| WO | WO-00/13115 | 3/2000 |
| WO | WO 00/13115 | 3/2000 |

OTHER PUBLICATIONS

International Search Report by the Japanese Patent Office dated Nov. 13, 2002 for International Patent Application PCT/JP02/11081.

* cited by examiner

| SPECIFIED ITEM LEVEL | ITEM ASSORTMENT | ASSORTMENT CODE | ITEM CODE | ITEM NAME (ENGLISH) | ITEM NAME (JAPANESE) | HEADCOUNT | UNIT | DRAWING NUMBER | DRAWING FORM | NUMBER OF DRAWINGS | PRODUCT | MATERIAL | STANDARD |
|---|---|---|---|---|---|---|---|---|---|---|---|---|---|
| 3ZX130U- 1 | UB | A | 40911-1095 | WRIST-UNIT | WRIST-UNIT | 1 | ST | | | 0 | ZX130S/165U | | |
| 3ZX130U- 2 | UP | A 001 | 60320-1123 | HOUSING,HAND 1 | HOUSING,HAND 1 | 1 | PC | 60320-1123C | D | 1 | ZX130/165 | FCD450 | |
| 3ZX130U- 3 | RM | | 61320-1123 | HOUSING-RM,HAND 1 | HOUSING-RM,HAND 1 | 1 | PC | 61320-1123C | D | 1 | ZX130/165 | FCD450 | |
| 3ZX130U- 2 | UP | A 002 | 60320-1124 | HOUSING,HAND 2 | HOUSING,HAND 2 | 1 | PC | 60320-1124B | D | 1 | ZX130/165 | FCD450 | |
| 3ZX130U- 3 | RM | | 61320-1124 | HOUSING-RM,HAND 2 | HOUSING-RM,HAND 2 | 1 | PC | 61320-1124B | D | 1 | ZX130/165 | FCD450 | |
| 3ZX130U- 2 | UP | A 007 | 60210-1212 | GEAR-SPUR,JT6-3 | GEAR-SPUR,JT6-3 | 1 | PC | 60210-1212C | C | 1 | ZX130/165 | SCM415-N | |
| 3ZX130U- 2 | UP | A 008 | 60210-1213 | GEAR-SPUR,JT6-4 | GEAR-SPUR,JT6-4 | 1 | PC | 60210-1213C | C | 1 | ZX130/165 | SCM415-N | |
| 3ZX130U- 2 | UP | A 009 | 60212-1136 | GEAR-BEVEL,JT5-1 | GEAR-BEVEL,JT5-1 | 1 | PC | 60212-1136A | C | 1 | ZX130/165/200 | SCM415-N | |
| 3ZX130U- 2 | UP | A 010 | 60212-1137 | GEAR-BEVEL,JT5-2 | GEAR-BEVEL,JT5-2 | 1 | PC | 60212-1137A | B | 1 | ZX130/165 | SCM415-N | |
| 3ZX130U- 2 | UP | A 011 | 60212-1138 | GEAR-BEVEL,JT6-1 | GEAR-BEVEL,JT6-1 | 1 | PC | 60212-1138A | B | 1 | ZX130/165/200 | SCM415-N | |
| 3ZX130U- 2 | UP | A 012 | 60212-1139 | GEAR-BEVEL,JT6-2 | GEAR-BEVEL,JT6-2 | 1 | PC | 60212-1139A | C | 1 | ZX130/165/200 | SCM415-N | |
| 3ZX130U- 2 | UP | A 013 | 60212-1140 | GEAR-BEVEL,JT6-3 | GEAR-BEVEL,JT6-3 | 1 | PC | 60212-1140A | C | 1 | ZX130/165 | SCM415-N | |
| 3ZX130U- 2 | UP | A 014 | 60212-1141 | GEAR-BEVEL,JT6-4 | GEAR-BEVEL,JT6-4 | 1 | PC | 60212-1141A | B | 1 | ZX130/165 | SCM415-N | |
| 3ZX130U- 2 | UP | A 015 | 60124-1218 | RETAINER,BEARING JT | RETAINER,BEARING JT6 | 2 | PC | 60124-1218A | B | 1 | ZX130/165/200 | SS400 | |
| 3ZX130U- 2 | UP | A 016 | 60132-1062 | RING,JT5 | RING,JT5 | 1 | PC | 60132-1062A | A | 1 | ZX130/165 | S45C-H | |
| ... | ... | ... | ... | ... | ... | ... | ... | ... | ... | ... | ... | ... | |

PRODUCT CODE: 13    SPARE (UNIT) 16    ITEM ASSORTMENT 18    FINAL PROCESS DAY:    PUBLICATION DAY: 2001/08/07    21

| ITEMIZE | W/O | WORK ITEMIZE | START | END | ASSORTMENT CODE | PART NUMBER | PART NAME | | DRAWING NUMBER | MATERIAL | SPECIFICATION STANDARD | QUANTITY | UNIT | ESTIMATED COST |
|---|---|---|---|---|---|---|---|---|---|---|---|---|---|---|
| Z | 8102003 | NP01 | 1 | 1 | SP01 | 50480-1006 | HAND ASSY 200 MAIN - A | SA | 50480-1006D | | | 0.00 | ST | |
| Z | 8102003 | NP02 | 1 | 1 | SP02 | 50480-1023 | HAND ASSY 300 MAIN - B | SA | 50480-1023A | | | 0.00 | ST | |
| Z | 8102003 | NP03 | 1 | 1 | SP03 | 50480-1041 | HAND ASSY 200 - A MAINTENANCE | SA | 50480-1041A | | | 0.00 | ST | |
| Z | 8102003 | NP04 | 1 | 1 | SP04 | 40912-1054 | ARM UNIT, X | UB | 40912-1054A | | | 0.00 | ST | |
| Z | 8102003 | NP05 | 1 | 1 | SP05 | 40912-1057 | ARM UNIT, X (300) | UB | 40912-1057A | | | 0.00 | ST | |
| Z | 8102003 | NP06 | 1 | 1 | SP06 | 40921-1011 | ROTOR UNIT, SHEETER | UB | 40921-1011A | | | 0.00 | ST | |
| Z | 8102003 | NP07 | 1 | 1 | SP07 | 40912-1064 | ARM UNIT, X - TH-311 | UB | 40912-1064B | | | 0.00 | ST | |
| Z | 8102003 | NP08 | 1 | 1 | SP08 | 60375-1831 | COVER, HOUSING 1 | UP | 60375-1831A | A2017 | | 0.00 | PC | |
| Z | 8102003 | NP09 | 1 | 1 | SP09 | 60375-1829 | COVER, HOUSING 2 | UP | 60375-1829A | A2017 | | 0.00 | PC | |
| Z | 8102003 | NP10 | 1 | 1 | SP10 | 60375-1830 | COVER, HOUSING 3 | UP | 60375-1830A | ACRYL (TRANSPARENT) | | 0.00 | PC | |
| Z | 8102003 | NP11 | 1 | 1 | SP11 | 50581-1009 | SENSOR ASSY (HIKARI), BEAM | UP | PR0503 | PURCHASE | | 0.00 | ST | |
| Z | 8102003 | NP12 | 1 | 1 | SP12 | PPFW38U | MACHINE SCREW, BRASS | UP | | | PF-M3-8 | 0.00 | PC | |
| Z | 8102003 | NP13 | 1 | 1 | SP13 | PSBM24U | HEXAGON SOCKET HEAD CAP SCREW | UP | | SUS304 | SB-M2-4 | 0.00 | PC | |
| Z | 8102003 | NP14 | 1 | 1 | SP14 | 50975-3708 | HARNESS ASSY (KINAI), S5 | SA | 50975-3708C | SUS304 | S5 HARNESS ASSY | 0.00 | ST | |
| Z | 8102003 | NP15 | 1 | 1 | SP15 | 40912-1062 | ARM UNIT, X-TH-311004 | UB | 40912-1062B | | | 0.00 | ST | |
| Z | 8102003 | NP16 | 1 | 1 | SP16 | 60375-1788 | COVER, HOUSING 1 | UB | 60375-1788B | A5052 | | 0.00 | PC | |
| Z | 8102003 | NP17 | 1 | 1 | SP17 | 60375-1789 | COVER, HOUSING 2 | UP | 60375-1789A | A5052 | | 0.00 | PC | |
| Z | 8102003 | NP18 | 1 | 1 | SP18 | PPFW36U | MACHINE SCREW, BRASS (SUS) | UP | | SUS304 | PF-M3-6 | 0.00 | PC | |
| Z | 8102003 | NP19 | 1 | 1 | SP19 | 50975-3708 | HARNESS ASSY (KINAI), S5 | SA | 50975-3708C | | S5 HARNESS ASSY | 0.00 | ST | |
| Z | 8102003 | NP20 | 1 | 1 | SP20 | 40580-1007 | SENSOR UNIT, 200 MAIN - B | UB | 40580-1007A | | | 0.00 | ST | |
| Z | 8102003 | NP21 | 1 | 1 | SP21 | 40580-1009 | SENSOR UNIT, 300 MAIN - B | UB | 40580-1009B | | | 0.00 | ST | |

Fig. 4

| PARENT ITEM CODE | LEVEL | ASSORTMENT CODE | CHILD ITEM CODE | DRAWING NUMBER | ENGLISH NAME | JAPANESE NAME | UNIT | HEADCOUNT | MATERIAL | SPECIFICATION |
|---|---|---|---|---|---|---|---|---|---|---|
| 3ZX130U- | 1 | A | 40911-1095 | | WRIST-UNIT | WRIST-UNIT | ST | 1 | | |
| 3ZX130U- | 2 | A 001 | 60320-1123 | 60320-1123C | HOUSING,HAND 1 | HOUSING, HAND 1 | PC | 1 | FCD450 | |
| 3ZX130U- | 3 | ...... | 61320-1123 | 61320-1123C | HOUSING-RM,HAND 1 | HOUSING-RM, HAND 1 | PC | 1 | FCD450 | |
| 3ZX130U- | 2 | A 002 | 60320-1124 | 60320-1124B | HOUSING,HAND 2 | HOUSING, HAND 2 | PC | 1 | FCD450 | |
| 3ZX130U- | 3 | ...... | 61320-1124 | 61320-1124B | HOUSING-RM,HAND 2 | HOUSING-RM, HAND 2 | PC | 1 | FCD450 | |
| 3ZX130U- | 2 | A 007 | 60210-1212 | 60210-1212C | GEAR-SPUR,JT6-3 | GEAR-SPUR, JT6-3 | PC | 1 | SCM415-N | |
| 3ZX130U- | 2 | A 008 | 60210-1213 | 60210-1213C | GEAR-SPUR,JT6-4 | GEAR-SPUR, JT6-4 | PC | 1 | SCM415-N | |
| 3ZX130U- | 2 | A 009 | 60212-1136 | 60212-1136A | GEAR-BEVEL,JT5-1 | GEAR-BEVEL, JT5-1 | PC | 1 | SCM415-N | |
| 3ZX130U- | 2 | A 010 | 60212-1137 | 60212-1137A | GEAR-BEVEL,JT5-2 | GEAR-BEVEL, JT5-2 | PC | 1 | SCM415-N | |
| 3ZX130U- | 2 | A 011 | 60212-1138 | 60212-1138A | GEAR-BEVEL,JT6-1 | GEAR-BEVEL, JT6-1 | PC | 1 | SCM415-N | |
| 3ZX130U- | 2 | A 012 | 60212-1139 | 60212-1139A | GEAR-BEVEL,JT6-2 | GEAR-BEVEL, JT6-2 | PC | 1 | SCM415-N | |
| 3ZX130U- | 2 | A 013 | 60212-1140 | 60212-1140A | GEAR-BEVEL,JT6-3 | GEAR-BEVEL, JT6-3 | PC | 1 | SCM415-N | |
| 3ZX130U- | 2 | A 014 | 60212-1141 | 60212-1141A | GEAR-BEVEL,JT6-4 | GEAR-BEVEL, JT6-4 | PC | 1 | SCM415-N | |
| 3ZX130U- | 2 | A 015 | 60124-1218 | 60124-1218A | RETAINER,BEARING,BEARING JT6 | RETAINER, BEARING JT6 | PC | 2 | SS400 | |
| 3ZX130U- | 2 | A 016 | 60132-1062 | 60132-1062A | RING,JT5 | RING JT5 | PC | 1 | S45C-H | |
| ... | | ... | ... | ... | ... | ... | ... | ... | | |

Fig. 5

PART CATALOG CREATING SYSTEM

TECHNICAL FIELD

The present invention relates to a part catalog creating system capable of creating catalogs of a plurality of parts composing a product obtained by assembling the plurality of parts.

BACKGROUND OF THE INVENTION

When a customer purchases a product composed of a plurality of parts and prepares spares of expendable parts of the product, or the parts break down and hence should be repaired, the customer needs a part catalog in which part numbers are listed for the customer to order the parts.

In the case of products composed of a few parts, it is relatively easy to create a part catalog for each product. However, in the case of products, for example, robot products, which are composed of numerous parts, and are required to meet various requirements of customers, and to deal with constantly advancing performance of control parts or the like, in an extreme case, products designed differently with very small difference for each product, the parts vary from product to product. In such products, therefore, it is not easy to create the part catalogs of the parts. In the case of the robot product, part configuration in each robot manufactured based on the customers' requirements varies from customer to customer, and its design cycle is extremely short. Therefore, in order to meet the customers' requirements, it is necessary to frequently create part catalogs containing different contents in a short period, which requires enormous labor and cost.

For this reason, the part catalogs of the robot products are created for a representative product in special occasion, for example, in a time period when new products are placed on sale, and thereafter, after services such as revision associated with design change are hardly provided. That is, the catalogs are transiently created. More often than not, the contents of the catalogs become obsolete, and hence become unserviceable.

Conventionally, the part catalogs associated with the robot product are created by manually selecting parts of the product from total part list in which all the parts used to manufacture the robot product are listed. Regardless of change in the parts to be used according to design change, there arise problems that part numbers before change are listed by mistake, wrong part numbers are described because of posting error, or optional parts demanded by the customer are not listed.

Further, it is virtually difficult to create the part catalogs to have a one to one correspondence with the robot products designed differently for each robot as described above, in view of required labor and cost effectiveness.

DISCLOSURE OF THE INVENTION

The present invention provides a part catalog creating system comprising:

(a) a part table creating means including a first storage portion configured to store a part table to be rewritable, the part table containing design change numbers respectively set for a plurality of parts composing a product obtained by assembling the plurality of parts and information corresponding to the design change numbers;

(b) a product number data creating means including a second storage portion configured to store product number data containing design change numbers and information of parts used for each of product numbers of a product assembled with different part configurations so as to correspond to the product numbers;

(c) a judgment means configured to compare a design change number of the product number data of the product that has been read out from the second storage portion to a design change number of the part table that has been read out from the first storage portion, select the design change number of the part table that coincides with the design change number that has been read out from the second storage portion, and remove design change numbers remaining unselected and information corresponding to the unselected design change numbers from the part table; and (d) a control means configured to create part catalog data for each product number of the product from the part table that contains the information corresponding to the design change number selected by the judgment means, and to output the part catalog data.

In accordance with the present invention, the judgment means compares the part table stored in the part table creating means to the product number data stored in the product number data creating means, and based on the design change number specified by the product number data, the part table corresponding to each product number of the product can be selected and created without human's labor. Therefore, the part table for each product number of the product can be created correctly and without a need for much labor, without errors in posting, missing of optional parts, etc.

So, in the case of the product, for example, a robot, which is composed of numerous parts, has a variety of part configurations according to the customers' requirements, and is designed in a short cycle, the part catalog having a one to one correspondence with the product can be created correctly and without much labor.

The part catalog creating system may further comprises an image creating means configured to create an image corresponding to the design change number selected by the judgment means, wherein the control means may be configured to create the part catalog data for each product number of the product, from the image created by the image creating means and the part table containing the design change number selected by the judgment means and information corresponding to the design change number, and to output the part catalog data.

In accordance with the present invention, the control means combines the part table selected by the judgment means with the image selected by the judgment means, and creates and output the part catalog data for each product number of the product. Thereby, the part catalog data including the image can be created so as to have a one to one correspondence with the product number of the product correctly and without much labor.

In the part catalog creating system, the information corresponding to the design change numbers which are stored in the first storage portion of the part table creating means may include header numbers, part numbers, and quantity (the number) of parts required to be assembled into the product, the information stored in the second storage portion of the product number data creating means may include design change numbers of parts used for each product number of the product, header numbers of the parts, part numbers of the parts, and quantity (the number) of parts to be assembled into the product, and the information corresponding to the unselected design change numbers removed from the part table by the judgment means may include header numbers, part numbers, and quantity (the number) of parts required to be assembled into the product.

In accordance with the present invention, the header number, the part number, and the quantity of parts required to be assembled into the product, each of which corresponds to the design change number, can be output as the part catalog data. Thereby, the part can be specified more easily.

In the part catalog creating system, the part catalog data output by the control means may include a part name corresponding to the design change number.

In accordance with the present invention, the part catalog created from the part catalog data includes the part name corresponding to the design change number. Since individual parts can be specified by the part names in addition to the images, required parts can be specified more correctly.

In the part catalog creating system, the control means may create the part catalog data for each product number of the product from the part table that contains the design change number selected by the judgment means, the part number and the quantity of the parts required to be assembled into the product each of which corresponds to the design change number, and output the part catalog data in such a manner that parts for standard equipment are distinguished from optional parts.

In accordance with the present invention, the optional parts equipped for each product number can be easily known, in addition to the parts for standard equipment, and preparation of the parts in the working station or the like is facilitated.

The part catalog creating system may further comprise:
a communication means configured to transmit the part catalog data output from the control means through a communication network, wherein the part catalog is searchable and accessible through the communication means.

In accordance with the present invention, the part catalog data for each product number which is output by the control means can be transmitted by the communication means through a communication network such as a public phone line. The communication network is realized by, for example, Internet. Customers, selling companies, and the like can search and access to the part catalog created for each product number which is transmitted through the communication means through terminals connected to the communication network.

In the part catalog creating system, the part catalog data output from the control means may be stored in an external storage medium to allow a part catalog to be delivered.

In accordance with the present invention, the part catalog stored in the external storage medium can be delivered to the customer together with the product. By delivering the part catalog stored in the storage medium, the customer does not confuse the product listed in the part catalog with the delivered product. In addition, with the part catalog corresponding to the delivered product, the customer can easily specify and order the required parts. Further, by storing the part catalog delivered together with the product, for example, in a storage portion provided in the product, missing of the part catalog can be avoided, and information relating to maintenance of the product can be easily obtained from the stored part catalog.

BRIEF DESCRIPTION OF THE DRAWINGS

FIG. 2 is a view showing an example of a part table;

FIG. 3 is a view showing an example of an output of optional part data stored in a second storage portion;

FIG. 4 is a view showing a distribution list image that provides an instruction on supply of parts to working sections;

FIG. 5 is a view showing an example of an output of a list for each robot number as a part table by a judgment means;

BEST MODE FOR CARRYING OUT THE INVENTION

Figure 1:
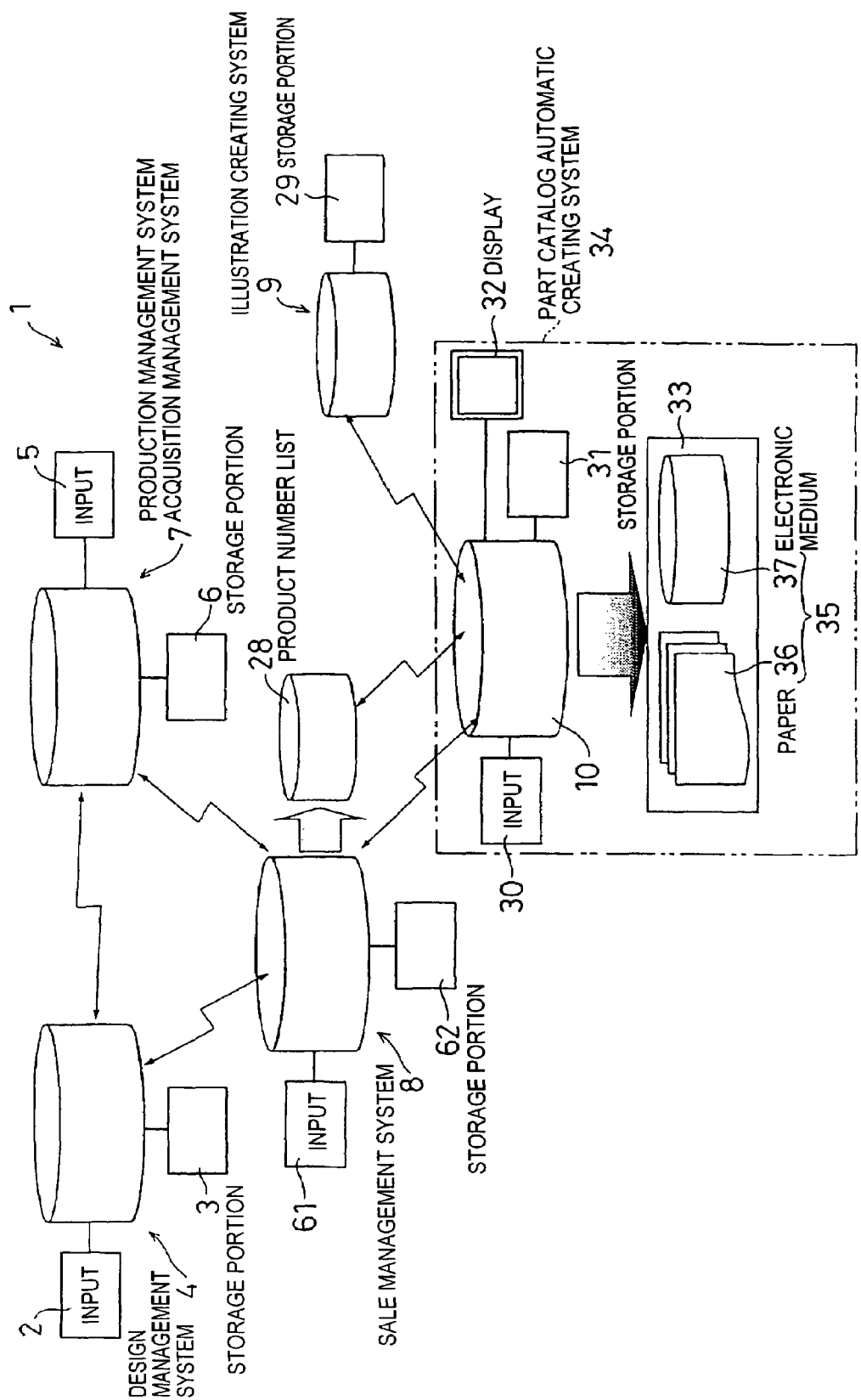
FIG. 1 is a view showing a simplified configuration of a part catalog creating system according to an embodiment of the present invention.

FIG. 1 is a view showing a simplified configuration of a part catalog creating system 1 according to an embodiment of the present invention. The part catalog creating system 1 comprises a part table creating means 4 comprised of a first input means 2 configured to input design change number set for each of a plurality of parts composing a product obtained by assembling the plurality of parts, and header number, part number, part name and quantity (the number) of parts required to be assembled into the product, each of which corresponds to the design change number, and a first storage portion 3 that stores a part table containing the design change number, the header number, the part number, the part name, and the quantity of parts required to be assembled into the product, each of which is input with the first input means 2, such that the part table is rewritable, a product number data creating means 7 comprised of a second input means 5 configured to input a design change number of a part used for each product number of a product assembled with different part configurations, and header number, part number, and quantity (the number) of parts required to be assembled into the product, each of which corresponds to the design change number, and a second storage portion 6 configured to store the design change number input with the second input means 5 as corresponding to the product number of the product, a judgment means 8 configured to compare the design change number corresponding to the product number of the product which has been read out from the second storage portion 6 to the design change number of the part table that has been read out from the first storage portion 3, select only the design change number of the part table that coincides with the design change number read out from the second storage portion 6, and remove design change numbers remaining unselected, and header numbers, part numbers, and quantity of parts required to be assembled into the product, each of which corresponds to the unselected design change numbers, from the part table, an image creating means 9 configured to create an image of the part corresponding to the header number, and a control means 10 configured to combine the part table that contains the design change number selected by the judgment means 8, the header number, the part number and the quantity of parts required to be assembled into the product each of which corresponds to the design change number with the image corresponding to the header number selected by the judgment means 8, create and output part catalog data for each product number.

In this embodiment, a robot product will be described as an example of a product. Hereinbelow, how to create a part catalog of the robot product will be described. The robot product comprises an arm portion and a control portion. The arm portion and the control portion comprise members forming groups into which a plurality of parts are assembled. Herein, for the sake of convenience, the robot is called a product and the arm portion and the control portion are called control equipment. Each member composed of a plurality of parts and forming the group in a layer lower than the arm portion and the control portion is called an assembly.

The part table creating means 4 is included in a system (herein, "design management system) having a function to input, hold, and output information relating to items of all the parts composing the robot and part configuration of the assembly, and information such as item change in the parts associated with design change in the robot product. The part table creating means 4 is a processing circuit realized by a computer or the like in which a central processing unit (CPU) is mounted.

The first input means 2 may be realized by, for example, a key board, with which character such as text and numeric character, is input, or may be realized by a bar code reader configured to read information from a bar code representing information, such as the design change number, the header number, the part number, the part name, and the required number, each of which corresponds to each part, and input the information. In order to reduce input errors, it is preferred that the bar code is created in advance and the information is input by the bar code reader.

As the first storage portion 3, a storage component such as a random access memory, a flash memory, or a hard disc which is capable of rewriting a stored content, is used. The first storage portion 3 stores the part table that contains the design change number, and the header number, the part number, the part name, the quantity of parts, and the like, each of which is input with the second input means 2. The first storage portion 3 is rewritable. When the item of the part, configuration of the assembly, and the like are changed according to the design change in the robot product, the change is overwritten or additionally written according to the change input with the first input means, thereby changing the part table.

Thus, the part table can be corrected according to sequential design change in the robot product. Therefore, revised version of the part catalog described later can be easily created according to the corrected content of the part table. As a result, the part catalog is inhibited from becoming obsolete.

FIG. 2 is a view showing an example of a part table 11. The part table 11 is an example obtained by reading the content stored in the first storage portion 3 and output onto a paper. In FIG. 2, number represented by alphabet and numeric values listed in column of assortment code 12 is header number of part, number represented by combination of numeric values listed in column of item code 13 is part number, combination of text and numeric values listed in columns of item name (English) 14 and item name (Japanese) 15 represent part name 16, and numeric value listed in column of head count 17 represent quantity (the number) of parts. In this embodiment, the design change number is used to specify the part by the part table creating means 4, the robot number data creating means 7, and the judgment means 4 for creation of the part catalog, but is not listed in the part table and the part catalog.

In this embodiment, other information such as drawing number 18 and material of each part are input with the first input means 2, and stored in the first storage portion 3. These information also form the part table 11. Information relating to all the parts used for manufacturing the robot product, are stored in the part table creating means 4, as the part table, regardless of the type and robot number of the robot product.

The robot number data creating means 7 comprises a system (herein referred to as "production management and acquisition management systems") having a function to input and store information relating to items of optional parts to be added to parts for standard equipment, which are used for assembling the robot, based on the parts for standard equipment and customers' requirements, and a function to output an instruction for acquiring the parts required for assembling and supplying the parts (hereinafter referred to as "distribution") to the assembling working section, when the robot number of the robot to be actually manufactured is determined. The robot number data creating means 7 is a processing circuit realized by a computer in which a central processing unit (CPU) is mounted.

The second input means 5 is realized by the bar code reader and/or the key board. With the second input means 5, the design change number of the part for the standard equipment and the optional part, and the robot number set as corresponding to the robot to be manufactured, are input. By doing this, the robot number of the robot to be manufactured is associated with the design change numbers of the parts to be used in the robot.

As the second storage portion 6, the storage component such as the random access memory, the flash memory, or the hard disc which can rewrite its stored content is used, as in the first storage portion 3. The robot number of the robot to be manufactured and the design change number of the part to be used for manufacturing and assembling the robot are stored in the second storage portion 6 for each robot.

In this embodiment, since the design management system comprising the part table creating means 4 is connected to the production management and acquisition management system comprising the robot number data creating means 7 as shown in FIG. 1, data such as the header number, the part number, the part name, and the quantity of parts are extracted from the part table according to the design change number input with the second input means 5, and the header number, the part number, or the like corresponding to the design change number input with the second input means 5 are stored in the second storage portion 6.

Figure 4:
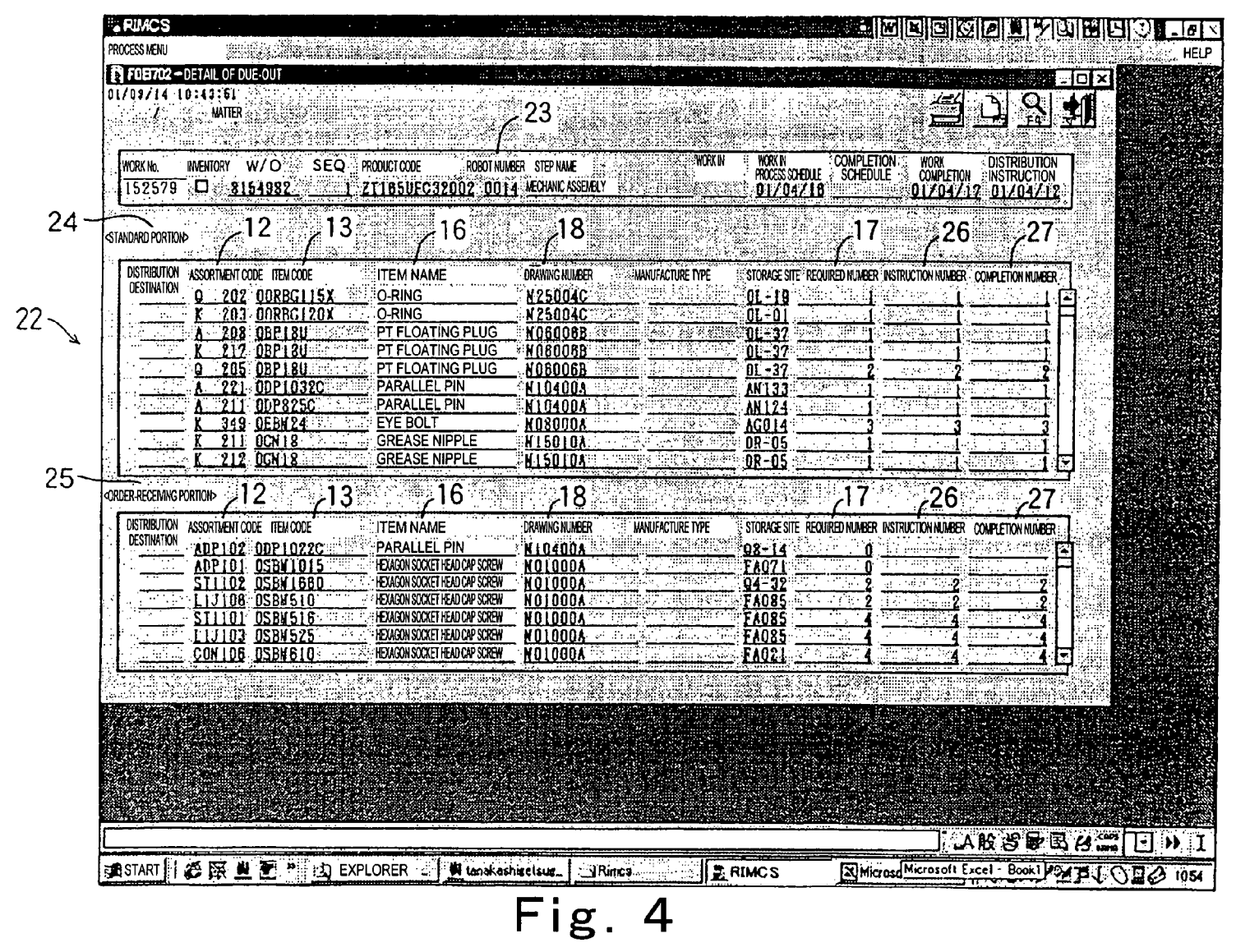

FIG. 3 is view showing an example of an output of optional part data 21 stored in the second storage portion 6. FIG. 4 is a view of an image of a distribution list 22 that provides instruction on supply of parts to working sections. The customer requests a manufacturer to add the optional parts for improvement of performance or the like according to use of the robot product and environment where the robot is used. The optional part is input to and stored in the second storage portion 6 such that the optional part is distinguished from the part for standard equipment. FIG. 3 shows the example of the optional part data 21, which are the content read out from the second storage portion 6 and output onto a paper. In FIG. 3, assortment code 12 is header number, part number 13 is number of the part, and part name 16 is name of the part. The optional part data 21 include quantity (the number) of parts 17, drawing number 18, material 19, and the like, in addition to the above described items.

Distribution list is part list output as an instruction for supplying parts required for assembling to the working section in each of manufacturing steps to manufacture the robot to be actually manufactured. FIG. 4 shows the example of the image of the distribution list 22 displayed on a display means (liquid crystal panel, monitor, etc) (not shown) included in the production management and acquisition management system. By way of example, the distribution list 22 represents the robot number 23 set as corresponding to the robot to be manufactured and input with the second input means 5, by "0014."

The distribution list 22 indicates parts for standard equipment and optional parts. A standard portion 24 indicates the parts for standard equipment and an order-receiving portion 25 indicates the optional parts. Therefore, in the part catalog described later which is created using data in the distribution list 22, the parts for standard equipment are distinguishable from the optional parts. In the distribution list 22, the assortment code 12 is the header number, item code 13 is part number, item name 16 is part name, and required number 17 is quantity (the number) of parts. Instruction number 26 displayed in the distribution list 22 represents the quantity of the parts to be supplied to the working section at the time point when the distribution list 22 is output, and completion number 27 represents the quantity of parts which have been supplied according to the instruction number 26.

The distribution list is created to include all the parts for standard equipment and optional parts which are required to be assembled into each robot to be manufactured and for each working step. Since the part data stored in the second storage portion 6 of the robot number data creating means 7 in order to output the distribution list has a one to one correspondence with the robot number of the robot to be actually manufactured and delivered to the customer, the part catalog for each robot number can be created based on the part data for each robot number stored in the second storage portion 2.

Turning back to FIG. 1, the judgment means 8 is included in the system (herein referred to as "sale management system") having a function to read out the part table from the first storage portion 3, select and output items and configuration of the parts to be sold, for the purpose of selling the parts used for manufacturing the robot product to a robot selling company, or a customer for each part, for each assembly, or for each control equipment.

The judgment means 8 responds to an input signal from the control means 10 that specifies a robot number for which the part catalog is to be created. Based on information relating to all the part configurations forming the robot, and information such as item change of the part associated with design change of the robot product, which is output from the part table creating means 4, and robot number part data from the robot number data creating means 7, the judgment means 8 creates and outputs a part table including only the design change number that coincides with the design change number corresponding to the robot number specified by the input signal, i.e., the parts used for manufacturing the robot for which the part catalog is to be created (the part table thus selected is sometimes referred to as "robot number list 28.") The judgment means 8 is a processing circuit realized by a computer in which a central processing unit (CPU) is mounted.

In this embodiment, the judgment means 8 creates the robot number list 28 according to the signal from the control means 10, specifying the robot number for which the part catalog is to be created. Alternatively, the judgment means 8 included in the sale management system may be provided with a fourth input means 61 and a fifth storage portion 62. In this configuration, the robot number for which the robot number list 28 is to be created is input with the fourth input means 61 as the information such as the sale management information, and in accordance with the input signal, the judgment means 8 may create the robot number list 28 and store the robot number list 28 in the fifth storage portion 62. In this case, in accordance with the signal from the control means 10, the robot number list 28 stored in the fifth storage portion 62 is output. The fourth input means 61 is realized by a barcode reader and/or keyboard, and the fifth storage portion 62 is realized by a storage component such as a random access memory, a flash memory, or a hard disc.

FIG. 5 shows an example of an output of the robot number list 28 as the part table created by the judgment means 8. In the robot number list 28, assortment code 12 is header number, child item code 13 is part number, English name 14 and Japanese name 15 are part names 16, and head count 17 is quantity (the number) of parts. In addition to these, the robot number list 28 includes material 19 to be output.

The image creating system 9 in FIG. 1 is an illustration creating system configured to create images corresponding to all the parts included in the part table created by the part table creating means 4, so called illustrations, as corresponding to the header numbers. The image creating system 9 is a processing circuit realized by a computer in which a central processing unit (CPU) is mounted. Also, the image creating system 9 is configured to form an image for each product, for each control equipment, and for each assembly, as well as the image for each part. For example, when a robot number of the robot to be actually manufactured is determined and set, and the robot number is input to the robot number data creating means 7 with the second input means 5, the robot number and an identification number with which group defined for each control equipment and for each assembly is identified, are input. And, the robot number and the group identification number, which have been given to the control means 10 by the robot number data creating means 7, are given to the image creating system 9 by the control means 10, thereby forming the images for each product to be manufactured according to the robot number and the group identification number, and for each control equipment and assembly forming the robot. The illustration creating system as the image creating means 9 is provided with a third storage portion 29 configured to store image data of the respective parts created as corresponding to the header numbers, image data of the product, image data of the control equipment and image data of the assembly.

The control means 10 is a processing circuit realized by a computer in which a central processing unit (CPU) is mounted. The third input means 30, the judgment means 8, and the image creating means 9 are connected to the control means 10, and the output of the control means 10 is given to the display means 32 and the storage means 33. In addition, the control means 10 is provided with a fourth storage portion 31 in which the part catalog data is stored. Herein, a section comprising the control means 10, the third input means 30, the display means 32, the storage means 33, and the fourth storage portion 31 and having a function to create and output the part catalog data is called a part catalog automatic creating system 34.

The third input means 30 is realized by a key board or the like. With the third input means 30, the robot number for which the part catalog is to be created is selected and is input to the control means 10. In response to the input signal from the third input means 30 that specifies the robot number, the control means 10 takes in the robot number list 28 corresponding to the specified robot number from the judgment means 8. Also, the control means 10 takes in the image data of each part with the header number corresponding to the robot number list 28 set, from the image creating system 9 or from the third storage portion 29 included in the image creating system 9. The control means 10 combine these image data to create the part catalog data for each robot number. The created part catalog data is output to one of or both of the display means 32 and the storage means 33 by the control means 10 and are stored in the fourth storage portion 31.

The display means 32 is realized by a liquid crystal display panel or a cathode ray tube. The storage means 33 comprises a printer and a recorder. The storage means 33 is configured to store the part catalog data in one of or both of the paper 36 and an electric medium 37 as external storage media 35 and create the part catalog. The electronic medium 37 may be, for example, a flexible disc (FD) by magnetic storage, or may be, for example, a compact disc (CD-R) by optical storage. The part catalog is offered in one or a plurality of forms selected from the paper, the FD, the CD-R, and the like.

The storage medium that contains the part catalog is offered to the customer together with, for example, the robot product. The storage medium given to the customer inhibits the customer from confusing the robot listed in the part catalog with the robot delivered to the customer, and the customer can easily specify and order required parts with reference to the part catalog corresponding to the delivered robot. Further, by storing the part catalog delivered together with the robot in a storage portion provided in the robot, missing of the part catalog can be avoided, and information relating to maintenance of the robot or the like can be easily obtained from the stored part catalog.

Figure 6:
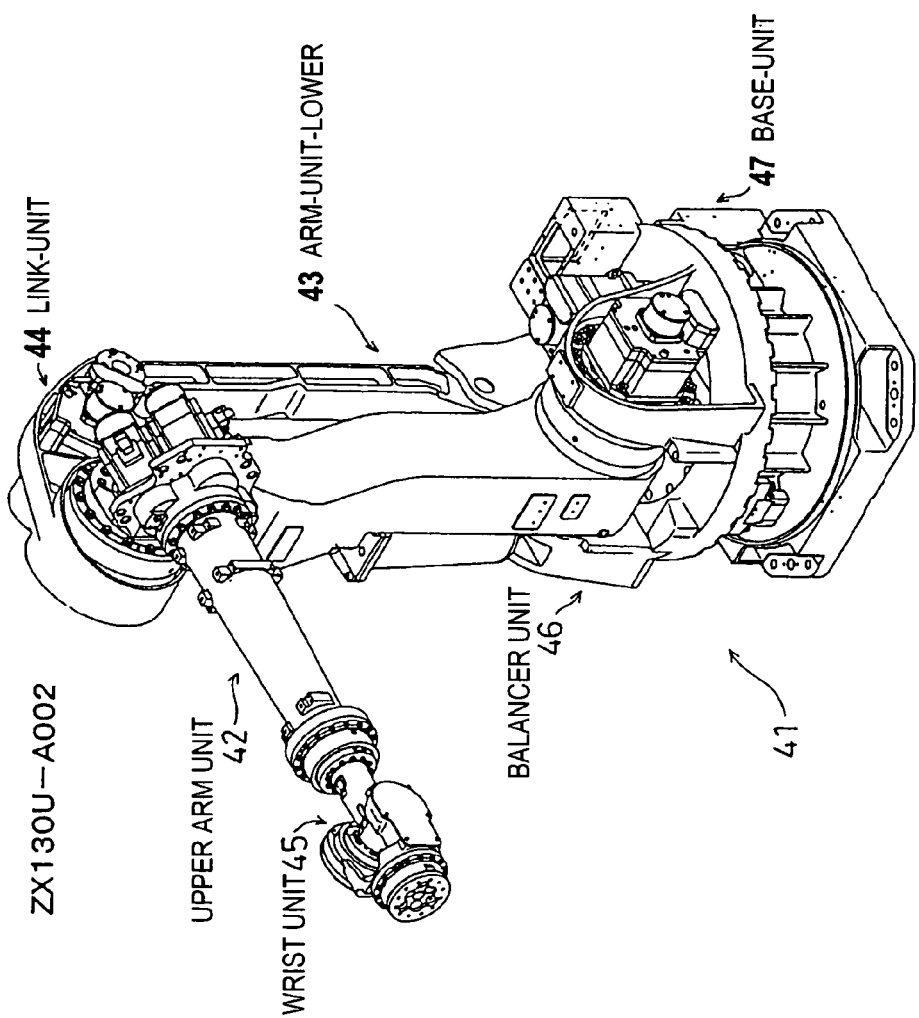
FIG. 6 is a view of an example of an image of a part catalog showing an apparatus construction of a robot.
Figure 7:
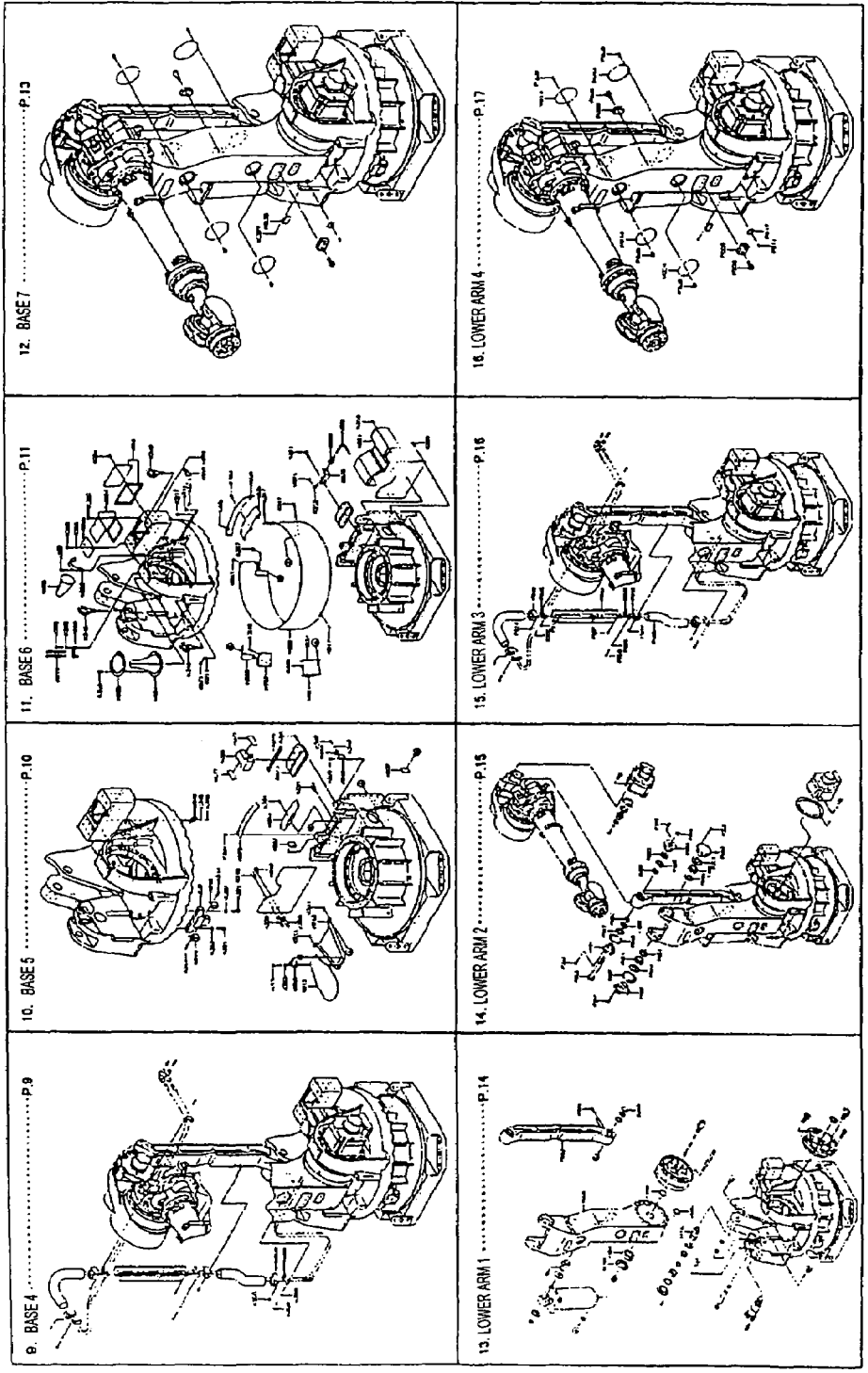
FIG. 7 is a view showing an example of a content list portion of the part catalog relating to each assembly of the robot.
Figure 8:
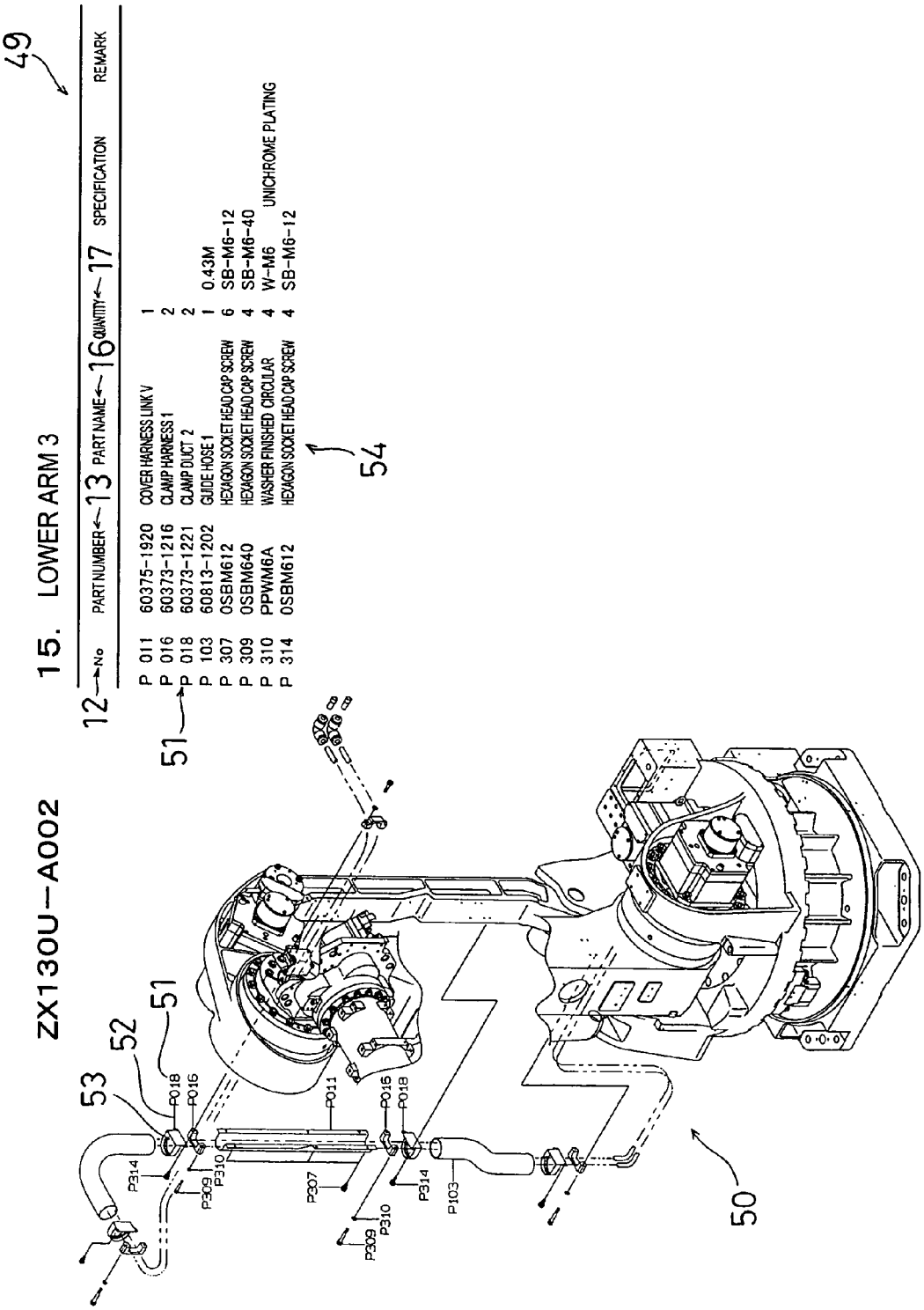
FIG. 8 is a view showing an example of the part catalog relating to an assembly of the robot.

FIG. 6 is a view showing an example of the image of the part catalog illustrating an apparatus construction of the robot. FIG. 7 is a view showing an example of a content list portion 48 of the part catalog associated with each assembly of the robot. FIG. 8 is a view showing an example of the part catalog of the parts forming the assembly of the robot.

FIGS. 6 to 8 illustrate the part catalog output onto the paper 36. FIG. 6 shows a construction of an apparatus called an arm portion 41 of the robot. As shown in FIG. 6, the arm portion 41 is composed of assemblies called units, i.e., an upper arm unit 42, a lower arm unit 43, a link unit 44, a list unit 45, a balancer unit 46, and a base unit 47.

The units 42 to 47 are each composed of assemblies in a lower layer, and the part catalogs are created for each of the assemblies. The part catalog for each assembly is illustrated in such a manner that the image and page of the assembly are displayed in the content list portion 48 in FIG. 8. For example, the part catalog relating to an assembly called "lower arm 3" is illustrated as listed on page 15 of the content list portion 48. On page 15, a part catalog 49 of the "lower arm 3" shown in FIG. 8 is found.

An image portion 50 of the part catalog 49 of the "lower arm 3" in FIG. 8 displays header number "P018" representing a clamp duct as one part of the "lower arm 3" as indicated by a reference numeral 51. The header number 51 represents that a shape of the clamp duct is an image (illustration) 53 indicated by a drawing line 52. Meanwhile, on a list portion 54 of the part catalog 49 of the "lower arm 3," the header number is displayed on the column of "No." On a line of the header number 51 "P018" on the list portion 54, part number "60373-1221", part name "clamp duct 2", and quantity of parts "2" are displayed.

FIGS. 6 to 8 show the part catalog obtained by outputting the part catalog data to the paper 36 (FIG. 1) of the storage means 33 by the control means 10. In the same manner, the part catalog data can be output to, for example, the display means 32 comprised of the liquid crystal panel. When the part catalog is displayed on the display means 32, the display means 32 is provided with a function in which link is formed between an image and a display portion on the image which are associated with each other by the header number, and free movement between images and between display portions on the image, is performed in accordance with an operation to select a hot spot formed on the image ("function similar to "hyperlink"). For example, among the image representing the configuration of the control equipment of the arm portion 41 in FIG. 6, the image of the content list portion 48 in FIG. 7, and the image of the part catalog 49 of the "lower arm 3" in FIG. 8, free movement is carried out by using a mouse or the like as the input means provided in the display means 32 to select the hot spot.

Figure 9:
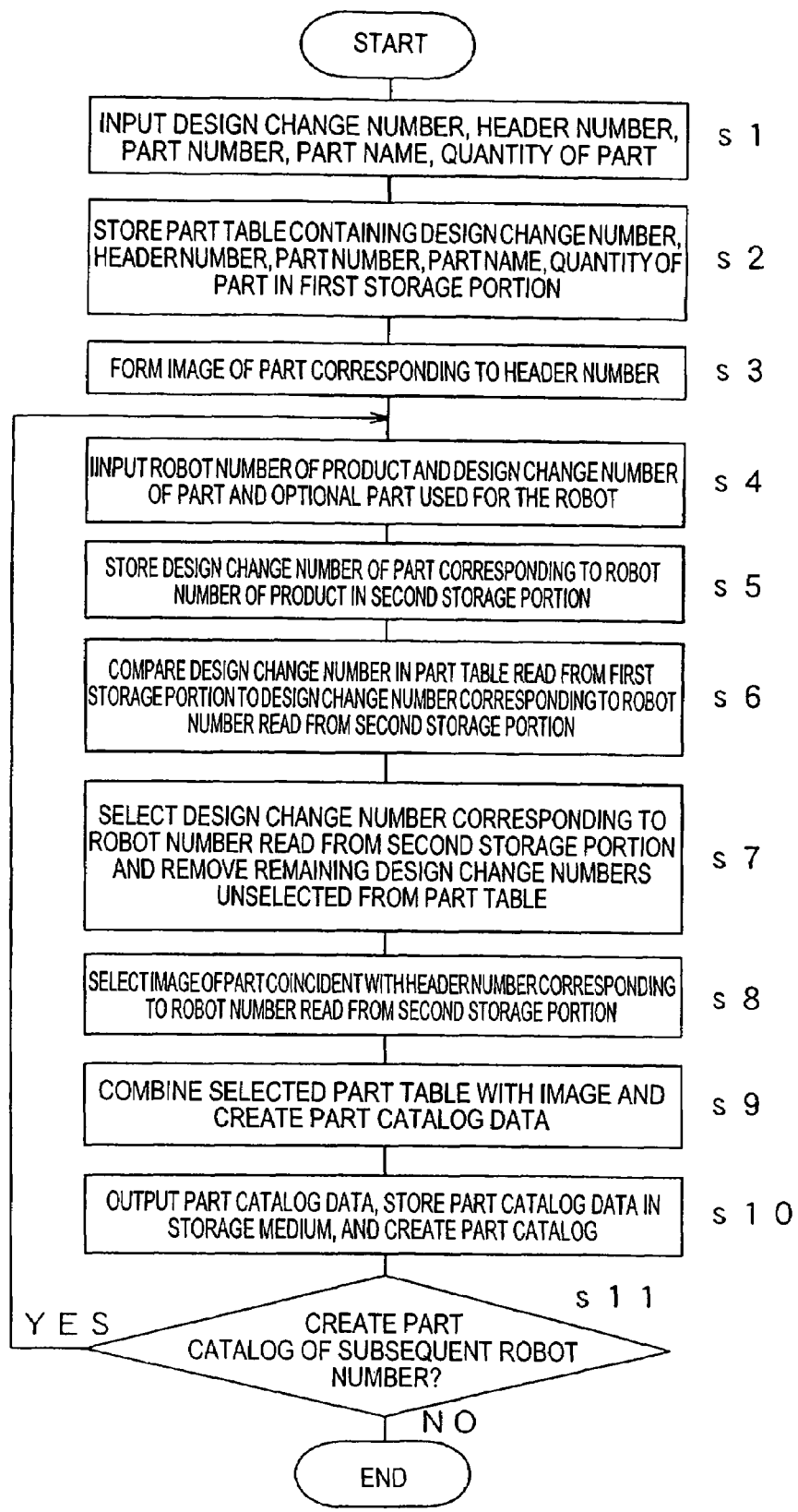
FIG. 9 is a flow chart for explaining a creating operation of the part catalog in a part catalog creating system 1.

FIG. 9 is a flowchart for explaining operations for creating the part catalog in the part catalog creating system 1. A series of operations for creating the part catalog for each robot number of the robot product by the part catalog creating system 1 will be described with reference to a flowchart in FIG. 9.

In step s1, with the first input means 2, a design change number set as corresponding to each of the parts used for manufacturing the robot product, header number, part number, part name, and quantity (the number) of parts required to be assembled into the robot product, each of which corresponds to the design change number, are input to the part table creating means 4. In step s2, the part table that contains the design change number, the header number, the part number, the part name, and the quantity of parts is stored in the first storage portion 3. In Step s3, the image creating means 9 creates an image (illustration) of each part corresponding to the header number. The created image of each part is stored in the third storage portion 29.

In Step s4, with the second input means 5, a robot number of a robot product and design change number of the part for standard equipment and optional part, which are used in the robot of the robot number, are input to the robot number data creating means 7. In Step s5, the robot number of the robot product and the design change number of the part corresponding to the robot number, which correspond to the input robot number data, are stored in the second storage portion 6.

In Step s6, the judgment means 8 compares the design change number in the part table which has been read out from the first storage portion 3 to the design change number corresponding to the robot number which has been read out from the second storage portion 6. In Step s7, the judgment means 8 selects only the design change number corresponding to the robot number which has been read out from the second storage portion 6, from the part table, and removes the remaining design change number which have not been selected, and header numbers, part numbers, and the like, which correspond to the remaining design change numbers, from the part table.

In Step s8, the control means 10 takes in the image of the part that coincides with the header number corresponding to the robot number which has been read out from the second storage portion 6. In step s9, the control means 10 combines the selected part table and the taken in image, thereby creating the part catalog data. In step s10, the control means 10 outputs the part catalog data to be stored in the storage means 33 and creates the part catalog.

In Step s11, it is judged whether or not the part catalog of a subsequent robot number should be created. When it is judged that the part catalog of the subsequent robot number should be created, processing returns to Step s4, and the following steps are performed. When it is judged that the part catalog of the subsequent robot number should not be created, the series of operations for creating the part catalog is completed.

The above described series of operations are for the case where the part table and the part catalog for each robot number are newly created. Operations for creating the part catalog for each robot number in the case where the created part table is stored in the first storage portion 3, various robot-number products have been already manufactured, and the robot number data for numerous robot-number products are stored in the second storage portion 6, will be described below.

First of all, with the third input means 30 (FIG. 1), the robot number for which the part catalog is to be created is selected and input to the control means 10. The control mean 10 outputs a signal for specifying the robot number to the judgment means 8. The judgment means 8 responds to the signal for specifying the robot number and starts the operation in step s6. The Step s6 and the following steps sequentially advance along the steps shown in the flowchart in FIG. 9. When it is judged that the part catalog of a subsequent robot number should be created in step s11, the robot number for which a subsequent part catalog is to be created is input to the control means 10 with the third input means 30, and the above described operation is repeated. When it is judged that the subsequent part catalog should not be created, the series of operations for creating the part catalog is completed.

As described above, the part table of the robot product is created, the robot number data creating means 7 specifies the parts used for the robot to be manufactured, and the judgment means 8 selects the parts from the part table and creates the robot number list 28 in accordance with the specification by the robot number data creating means 7. The control means 10 combines the robot number list 28 and the images of the parts corresponding to the header numbers in the robot number list 28 and creates the part catalog.

As should be appreciated from the forgoing, in contrast to a case where the parts used for the robot to be manufactured are manually selected from the part table, mistakes in selection and errors in posting can be avoided and the parts can be selected without manual labor. Therefore, it is possible to significantly reduce the labor required for creating the part catalog, and create the part catalog having a one to one correspondence with the robot number of the product. In addition, the part table is rewritable and when the parts used for manufacture are changed according to design change, the data in the part table creating means 4 is rewritten with the first input means 2. Thereby, the part table can be easily updated and the part catalog based on the part table can be updated. As a result, the part table is inhibited from becoming obsolete.

Figure 10:
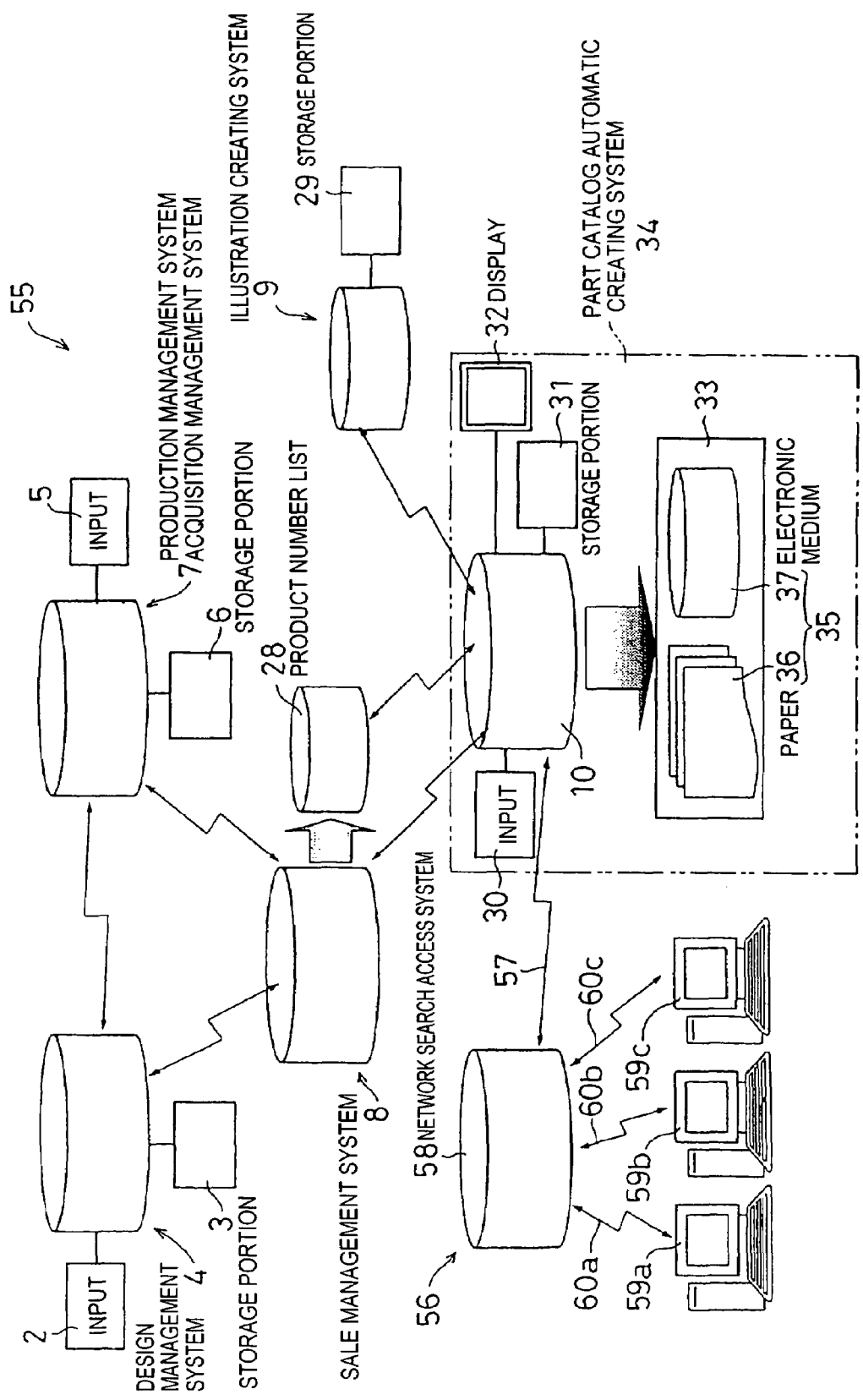
FIG. 10 is a view showing a simplified configuration of a part catalog creating system according to a second embodiment of the present invention.

FIG. 10 is a view showing a simplified configuration of a part catalog creating system 55 according to a second embodiment of the present invention. The part catalog creating system 55 of this embodiment is similar to the part catalog creating system 1 of the first embodiment, and in FIG. 10, the same reference numerals as those in FIG. 1 denote the same or corresponding parts, which will not be further described. It should be noted that the part catalog creating system 55 further comprises a communication means 56 configured to transmit the part catalog data output from the control means 10 through a communication network.

The control means 10 of the part catalog creating system 55 is connected to a public phone line 57 through a communication modem or the like, and the public phone line 57 is connected to a network search access system 58 in FIG. 10, thereby enabling communication. The network search access system 58 is realized by, for example, Internet. The communication modem, the public phone line 57, and the network search access system 58 realized by the Internet configure the communication means 56.

The customer and the selling company that can search and access to the part catalog comprise terminals 59a, 59b, and 59c for search and access and communication modems (including communication equipment such as routers). The terminals 59a, 59b, and 59c are connected to public phone lines 60a, 60b, and 60c through the communication modems, respectively. Since the public phone lines 60a, 60b, and 60c are connected to the network search access system 58, the customer, the selling company, and the like can search and access to the part catalog for each robot number which is output from the control means 10 or the part catalog for each robot number which is stored in the fourth storage portion 31.

By configuring so that the part catalog data for each robot number of the product which is output from the control means 10 through the communication means including a communication network such as the public phone line, the customer, the selling company and the like can search and access to the part catalog for each robot number of the product which is transmitted though the communication means by using the terminals connected to the communication network. Thereby, newest catalog data is easily accessible even in a remote place.

INDUSTRIAL APPLICABILITY

In accordance with the present invention, it is possible to create part catalogs having a one to one correspondence with a robot number of a product correctly and without much labor, for products such as robot products which are composed of numerous parts, have a variety of part configurations according to customers' requirements, and are designed in short cycles.

The invention claimed is:

1. A part catalog creating system comprising:
(a) a part table creating means including a first storage portion configured to store a part table to be rewritable, the part table containing design change numbers respectively set for a plurality of parts composing a product obtained by assembling the plurality of parts, header numbers corresponding to the design change numbers, part numbers corresponding to the design change numbers and quantity of parts corresponding to the design change numbers and required to be assembled into the product;
(b) an input means for inputting product numbers of a product assembled with different part configurations, design change numbers of parts used for each of the product numbers of the product, and group identification numbers each of which is for identifying a group comprising one of an assembly or control equipment in the product of the product numbers;
(c) a product number data creating means including a second storage portion configured to store product number data containing the design change numbers and the group identification numbers which are input by the input means so as to correspond to the product numbers input;
(d) a judgment means configured to compare a design change number of the product number data of the product that has been read out from the second storage portion to a design change number of the part table that has been read out from the first storage portion, select the design change number of the part table that coincides with the design change number that has been read out from the second storage portion, and remove design change numbers remaining unselected, header numbers corresponding to the unselected design change numbers, part numbers corresponding to the unselected design change numbers, and quantity of parts corresponding to the unselected design change numbers and required to be assembled into the product, from the part table; and (e) a select and input means for selecting and inputting a product number for which a part catalog is to be created;

(f) a control means configured to cause the judgment means to select the design numbers according to the product number input by the select and input means and create part catalog data for each product number of the product from the part table that contains header numbers corresponding to the design change numbers selected by the judgment means, part numbers corresponding to the selected design change numbers, and quantity of parts corresponding to the selected design change numbers and required to be assembled into the product and to output the part catalog data, (g) an image creating means configured to create an image of the part corresponding to the design change number selected by the judgment means, an image of the control equipment, and an image of the assembly corresponding to the group identification number included in the product number data of the product which has been read out from the second storage portion, (h) wherein the control means creates the part catalog data for each product number of the product, based on the images of the part, the control equipment, and the assembly created by the image creating means, and the part table that contains the design change number selected by the judgment means, the part number and the quantity of the parts required to be assembled into the product, each of which corresponds to the selected design change number, wherein the control means outputs the part catalog data such that parts for standard equipment and optional parts are displayed in a standard portion and an order-receiving portion, respectively, to distinguish the standard equipment from the optional parts; and (i) the part catalog data further includes quantity of the optional parts to be supplied and quantity of the optional parts which have been supplied.

2. The part catalog creating system according to claim 1, further comprising: a communication means configured to transmit the part catalog data output from the control means through a communication network, wherein the part catalog is searchable and accessible through the communication means.

3. The part catalog creating system according to claim 1, wherein the part catalog data output from the control means is stored in an external storage medium to allow the part catalog to be delivered.

4. A part catalog creating system comprising:

a part table creating means including a first storage portion configured to store a part table to be rewritable, the part table containing:

design change numbers respectively set for a plurality of parts composing a product obtained by assembling the plurality of parts, header numbers corresponding to the design change numbers, part numbers corresponding to the design change numbers, and quantity of parts corresponding to the design change numbers and required to be assembled into the product;

an input means for inputting product numbers of a product assembled with different part configurations, design change numbers of parts used for each of the product numbers of the product, and group identification numbers each of which is for identifying a group comprising one of an assembly or control equipment in the product of the product numbers;

a product number data creating means including a second storage portion configured to store product number data containing the design change numbers and the group identification numbers which are input by the input means so as to correspond to the product numbers input;

a judgment means configured to:

compare a design change number of the product number data of the product that has been read out from the second storage portion to a design change number of the part table that has been read out from the first storage portion, select the design change number of the part table that coincides with the design change number that has been read out from the second storage portion, and remove from the part table:

design change numbers remaining unselected, header numbers corresponding to the unselected design change numbers, part numbers corresponding to the unselected design change numbers, and quantity of parts corresponding to the unselected design change numbers and required to be assembled into the product;

a select and input means for selecting and inputting a product number for which a part catalog is to be created;

a control means configured to cause the judgement means to select the design numbers according to the product number input by the select and input means and create part catalog data for each product number of the product from the part table that contains header numbers corresponding to the design change numbers selected by the judgment means, part numbers corresponding to the selected design change numbers, and quantity of parts corresponding to the selected design change numbers and required to be assembled into the product and to output the part catalog data and output the part catalog data from the control means to an external storage medium;

an image creating means configured to create an image of the part corresponding to the design change number selected by the judgment means, an image of the control equipment, and an image of the assembly corresponding to the group identification number included in the product number data of the product;

wherein the control means creates the part catalog data for each product number of the product, based on the images of the part, the control equipment, and the assembly created by the image creating means, and the part table that contains the design change number selected by the judgment means, the part number and the quantity of the parts required to be assembled into the product, each of which corresponds to the selected design change number;

wherein parts for standard equipment and optional parts are displayed in a standard portion and an order-receiving portion, respectively, to distinguish the standard equipment from the optional parts; and wherein the part catalog data further includes quantity of the optional parts to be supplied an quantity of the optional parts which have been supplied.

* * * * *